No. 640,206. Patented Jan. 2, 1900.
D. KLEIN & W. P. SWARTZ.
MILKING APPARATUS.
(Application filed Dec. 19, 1898.)
(No Model.) 2 Sheets—Sheet 1.
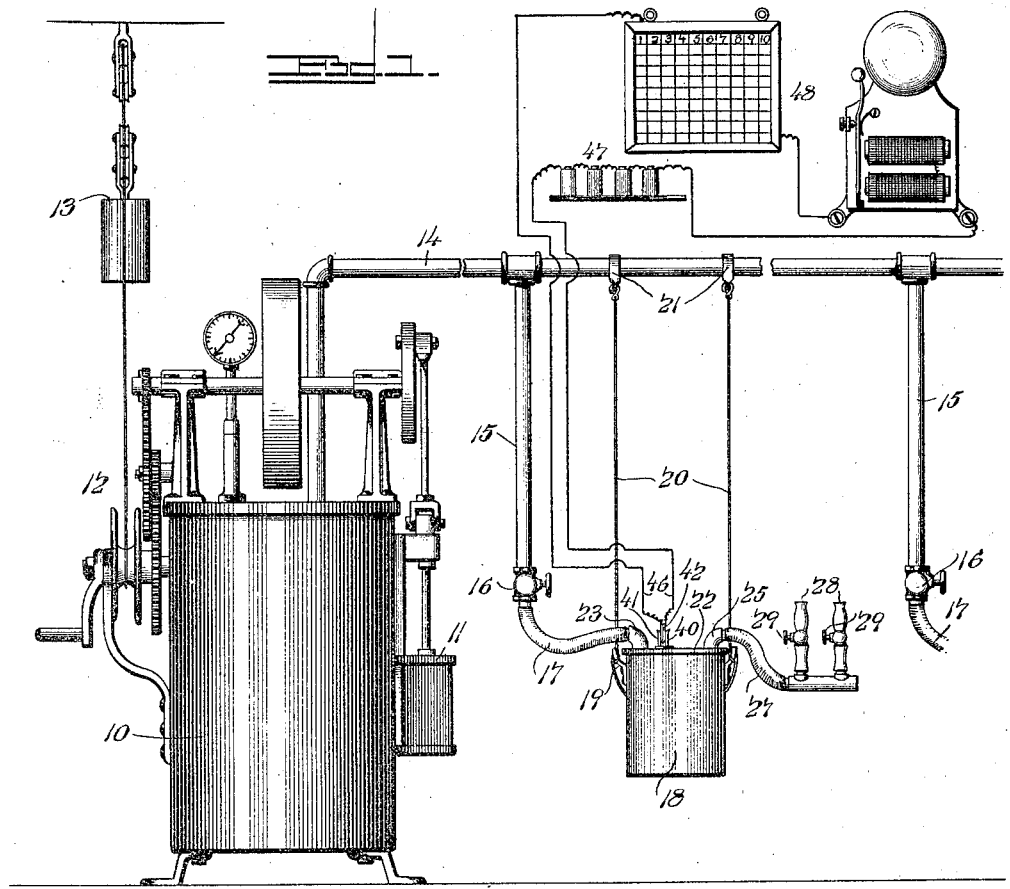
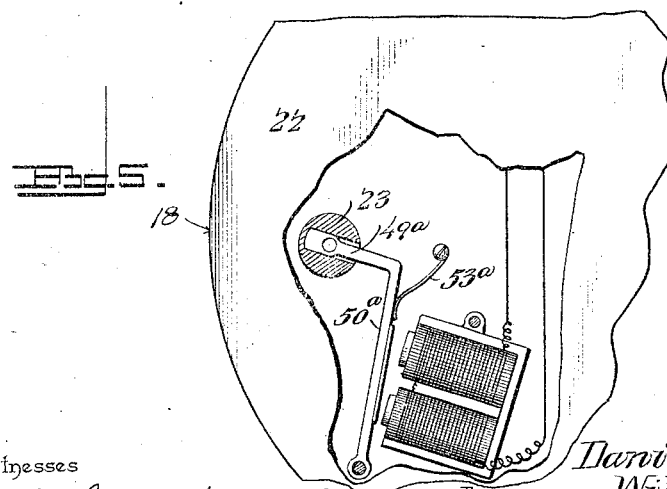
Witnesses
E. K. Stewart
Daniel Klein, Inventors
William P. Swartz
By their Attorneys.
C. A. Snow & Co.

No. 640,206. Patented Jan. 2, 1900.
D. KLEIN & W. P. SWARTZ.
MILKING APPARATUS.
(Application filed Dec. 19, 1898.)
(No Model.) 2 Sheets—Sheet 2.
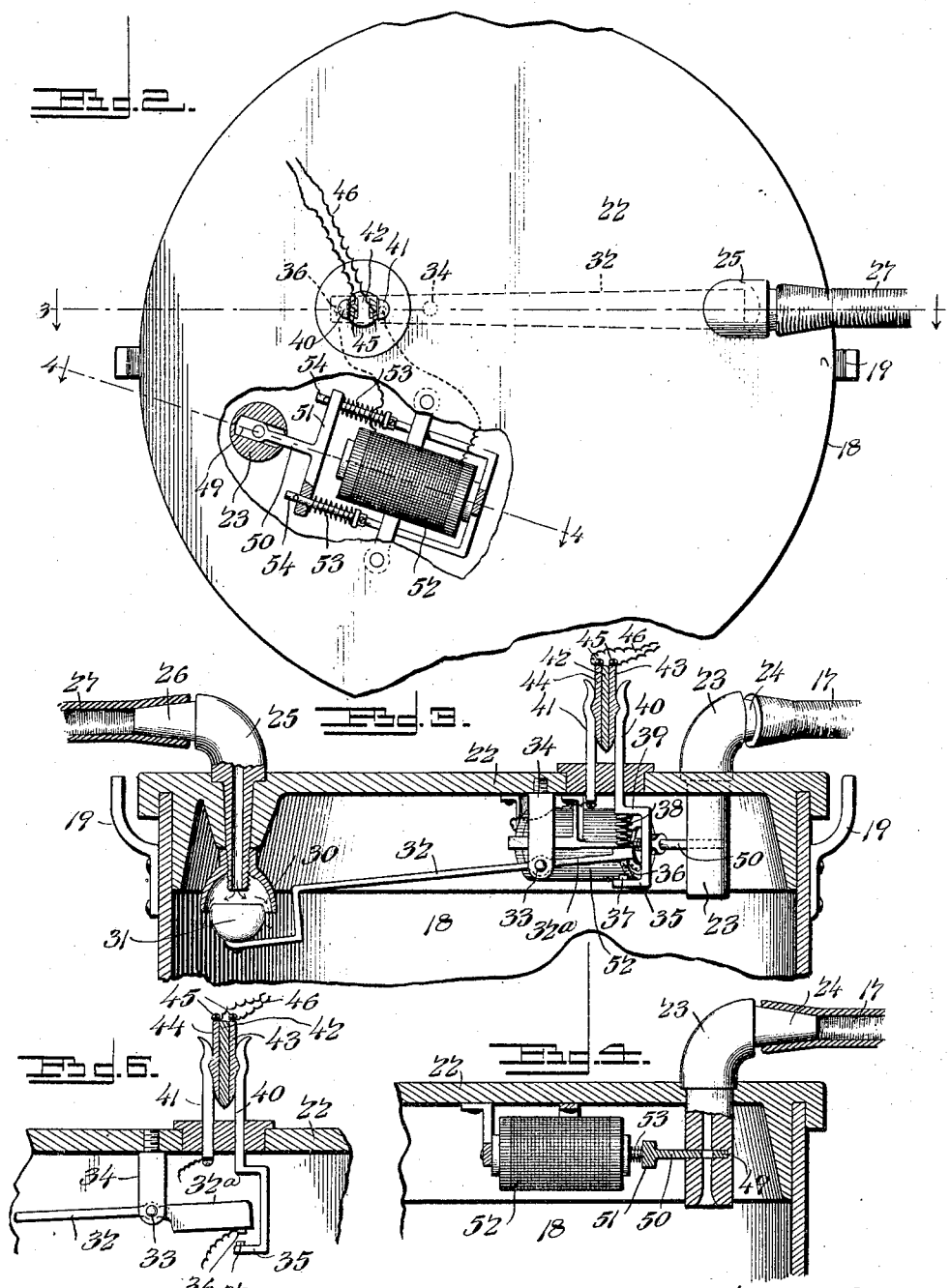
Witnesses
E. K. Stewart
Inventors
Daniel Klein
William P. Swartz
By their Attorneys,
C. A. Snow & Co.

UNITED STATES PATENT OFFICE.

DANIEL KLEIN AND WILLIAM P. SWARTZ, OF POUGHKEEPSIE, NEW YORK.

MILKING APPARATUS.

SPECIFICATION forming part of Letters Patent No. 640,206, dated January 2, 1900.

Application filed December 19, 1898. Serial No. 699,730. (No model.)

*To all whom it may concern:*

Be it known that we, DANIEL KLEIN and WILLIAM P. SWARTZ, citizens of the United States, residing at Poughkeepsie, in the county of Dutchess and State of New York, have invented a new and useful Milking Apparatus, of which the following is a specification.

Our invention relates to a milking apparatus, and particularly to an improvement in milk-receptacles of that class shown and described in connection with a milking apparatus disclosed in a former patent, No. 598,423, granted to Daniel Klein on February 1, 1898, and an improvement is also shown in a former application filed by us on April 18, 1898, Serial No. 678,016; and the object in view is to provide an improved construction of signaling device and means for checking the suction within the receptacle and cutting off the flow of liquid into the receptacle when the surface of the contents of the receptacle reaches a predetermined level.

Further objects and advantages of this invention will appear in the following description, and the novel features thereof will be particularly pointed out in the appended claims.

In the drawings, Figure 1 is a diagrammatic view of a milking apparatus including a receptacle and signaling devices constructed in accordance with our present invention. Fig. 2 is a plan view, partly broken away, of a milk-receptacle constructed in accordance with our invention. Fig. 3 is a vertical sectional view of the same on the plane indicated by the line 3 3 of Fig. 2. Fig. 4 is a vertical sectional view on the plane indicated by the line 4 4 of Fig. 2. Fig. 5 is a detail plan view of a portion of the apparatus, showing a modified construction of the means for actuating the exhaust-controlling valve. Fig. 6 is a detail view of one end of the supporting-lever when constructed for actuation by gravity.

Similar reference characters indicate corresponding parts in all the figures of the drawings.

The exhausting mechanism which may be used in an apparatus of this class for producing the necessary vacuum or partial vacuum in the milk-receptacles may be varied in construction and may be as shown and described in said former patent of Klein, and hence we have deemed it sufficient, in connection with our present invention, to illustrate the same as in Fig. 1, wherein 10 represents an exhaust-chamber, and 11 a pump actuated by suitable driving mechanism 12, with which an operating-weight 13 may be connected, a conveyer 14 being arranged in communication with said exhaust-chamber and being provided at intervals with branches 15 for the several stalls in which the cattle are to be located during the milking operation. These branches are provided, respectively, with controlling-valves 16, and flexible tube-sections 17 connect the branches, respectively, with the milk-receptacles 18. In the construction illustrated each milk-receptacle consists of a cylindrical vessel provided with side ears or keepers 19, to which are attached the lower ends of suspending-cords 20, suitably supported, as by the above-mentioned conveyer 14, which extends transversely across the cattle-stalls, lateral adjustment of the suspending-cords being accomplished by means of eyes or rings 21, which are mounted upon said conveyer for axial movement. The receptacle-cover 22 is suitably fitted upon the upper edge of the wall of the receptacle and is provided with an exhaust-nozzle 23, having a nipple 24, upon which the adjacent extremity of the flexible tube-section 17 is adjusted, and the inner end of the exhaust-nozzle is in communication with the interior of the receptacle to provide for withdrawing the air from the receptacle when the valve 16 is open. Also carried by the lid or cover is a supply-nozzle 25, having a nipple 26, upon which is adjusted the extremity of a tube-section 27, in communication with teat-cups 28, each of which, as in the construction set forth in the above-mentioned patent and application, is provided with a controlling-valve 29. The inner end of the nozzle 25 communicates with the interior of the receptacle to convey liquid thereinto and is provided with an inverted-cup-shaped deflector 30, of which the under concave surface constitutes a valve-seat for the reception of an element 31, constituting a combined pressure-plate and float-valve, whereby when the surface of the liquid contents of the receptacle comes in contact with said element the latter is elevated and seated in the deflector 30 to cut off further flow of liquid into the receptacle. The upper surface of this element 31, which may be termed a "floating" or "buoyant" pressure-plate, is flat or is otherwise constructed to receive the impact of liquid entering the receptacle through the nozzle 25, and as this pressure-plate or impact-receiving element is vertically movable and is yieldingly supported by means (hereinafter described) for automatically seating the same when relieved of pressure the impact of the liquid entering the receptacle through the nozzle 25 is designed to normally maintain the element unseated. The floating or buoyant supply-nozzle-controlling element 31 thus performs the double function of an automatic valve for closing the supply-nozzle and an impact or pressure plate for receiving the weight and impact of liquid entering the receptacle to normally hold said element depressed, and in the construction illustrated said element is supported by a lever 32, which is fulcrumed at an intermediate point, as shown at 33, upon a hanger 34, depending from the lid or cover 22. The short arm 32$^a$ of this lever, which for convenience we will term the "stop-arm," is arranged in operative relation with a stop 35, and said stop-arm and stop respectively carry contact-points 36 and 37, which form the normally-separated terminals of an electrical circuit, whereby when the stop-arm is depressed by the elevation of the impact-receiving element 31 to bring the contact-point 36 into contact with the point 37 the electrical circuit is completed for a purpose hereinafter explained. It is desirable, however, that this operative relation of the contact-points 36 and 37 may be attained automatically should the flow of liquid through the supply-nozzle 25 cease, as when the supply of liquid is checked or is exhausted, and therefore in connection with the stop-arm we employ a seating-spring 38, of which the upper end bears against an offset 39 of said stop 35. This stop is supported by and forms an element of one member 40 of a plug-socket also carried by the lid or cover of the receptacle, and between said member 40 and a coöperating plug-socket member 41 is removably fitted a plug 42, having opposite contact-plates 43 and 44, with which, by means of suitable binding-screws 45, are connected the terminals of electrical conductors 46 in circuit with a suitable battery 47. Also included in this circuit is an enunciator 48, of any suitable or preferred construction, which may be provided with an alarm-bell and an indicator, by which a number will be exposed to designate the stall in which the milking operation has ceased when the circuit, which is controlled by the switch mechanism in the receptacle of that stall, has been closed. It is also desirable, however, when the circuit is completed and the supply-nozzle has been closed by the seating of the element 31 to cut off communication between the interior of the receptacle and the exhaust-conveyer, and hence we employ in connection with each exhaust-nozzle 23 a cut-off valve 49, of which the stem 50 is connected with an armature 51, arranged in operative relation with the electromagnet 52, also included in the above-described circuit with the battery 47, said armature being yieldingly held in position to maintain the valve 49 in its open position by means of return-springs 53, fitted upon guide-rods 54 or otherwise disposed to accomplish the desired object. Therefore in operation the switch, consisting of the stop-arm 32$^a$ and stop 35, is held open by the impact of liquid entering the receptacle through the supply-nozzle and impinging upon the impact element 31, the force thus exerted being sufficient to overcome the seating tendency of the spring 38; but when this flow of liquid ceases, as by the supply becoming exhausted or for any analogous cause, or when the level of the liquid in the receptacle reaches an elevation sufficient to raise the said element 31 the switch will be closed to complete the circuit, thus notifying the attendant not only of the fact that the milking operation has ceased in one of the stalls, but indicating in which stall the same has occurred and also closing the valve 49, and thereby cutting off communication between the receptacle and the exhaust-conveyer, whereby the further effect of the exhaust apparatus upon the interior of the receptacle in question is checked.

The switch and coöperating mechanism which are used in connection with each receptacle are inclosed within the lid upon which it is arranged by means of a shield 55, which leaves only the element 31, the adjacent portion of the lever 32, and the inverted-cup-shaped deflector 30 exposed, and it is obvious that the removable plug 42 provides for disconnecting the lid from the electrical circuit, and thus providing for the subsequent arrangement of the lid in connection with a receptacle in another stall. After a receptacle has been suspended in operative position, as hereinbefore described, and the lid has been applied, connection being made with the flexible tube-section 17 by adjusting the extremity thereof upon the nipple 24, the valves should be opened to allow the air within the receptacle to be exhausted, and thus initiate the flow of liquid through the nozzle 25 into the receptacle. This flow of liquid by impact with the element 31 depresses the latter and opens the switch, after which the plug 42 may be inserted to arrange the apparatus in circuit with the battery, whereby a change in the relation of the parts, as hereinbefore explained, will be indicated by the alarm mechanism. The function of the deflector 30 is to prevent the splashing of the liquid from the flat surface of the element 31 and cause said liquid to fall vertically into the body of the receptacle, and the shield assists in protecting the operating mechanism not only from splashed liquid, but also from dust and other foreign substances.

It will be understood that the parts of the mechanism above described are susceptible of numerous modifications—for instance, in Fig. 5 we have shown a modification in the arrangement of the exhaust-cut-off valve, wherein the same, as indicated at 49ª, is connected with a pivotal swinging arm 50ª, in contact with which is arranged a plate-spring 53ª, the operation, however, being the same as that hereinbefore described—and, furthermore, it will be understood that any yielding force may be employed for automatically closing the switch, such as weighting the short or stop arm 32ª, as indicated in Fig. 6, the object being to employ such a construction and arrangement of parts as to not only cause the closing of the exhaust-nozzle and the actuation of the signaling device when the operation of milking ceases, but to insure the automatic return of the parts to their normal or operative positions when the lid is disconnected from the battery-circuit, as by the withdrawal of the plug 42 from the plug-socket. It will be understood that all of the electrically-affected elements of the apparatus are suitably insulated from the receptacle to prevent exposing the liquid contents thereof to the circuit. Moreover, it will be understood that various other changes in the form, proportion, and the minor details of construction may be resorted to without departing from the spirit or sacrificing any of the advantages of the invention.

Having described our invention, what we claim is—

1. In a milking apparatus, the combination with a receptacle, and means, including a conveyer, for exhausting the air from the interior of the receptacle, of a liquid-supply nozzle, an impact element arranged in the path of incoming fluid, and a switch having a movable member operatively connected with said impact element, an exhaust-controlling valve, and a magnet for actuating the valve, the switch being in electrical circuit with the magnet and an alarm mechanism, substantially as specified.

2. In a milking apparatus, the combination with a receptacle, and means, including a conveyer, for exhausting the air from the interior of the receptacle, of a liquid-supply nozzle, an impact element arranged in the path of incoming fluid, and a switch operatively connected with said impact element, the switch being in electrical circuit with an alarm mechanism, a circuit-closing spring for opposing the pressure of liquid upon said impact element and an electrically-controlled valve in operative connection with the exhausting-conveyer and included in the said circuit, substantially as specified.

3. In a milking apparatus, the combination with a receptacle, and means, including a conveyer, for exhausting the air from the interior of the receptacle, of a liquid-supply nozzle, an impact element arranged in the path of incoming fluid, and a switch having a movable member forming one element of a lever by which said impact element is supported, the switch being in electrical circuit with an alarm mechanism, means for automatically closing the switch when the impact element is relieved of the pressure of the incoming liquid and an electrically-controlled valve in operative connection with the exhausting-conveyer and included in the said circuit, substantially as specified.

4. In a milking apparatus, the combination with a receptacle, and means, including a conveyer, for exhausting the air from the interior of the receptacle, of a liquid-supply nozzle, an impact element arranged in the path of incoming fluid, a switch having a yieldingly-actuated movable member operatively connected with said impact element, a plug-socket having members connected respectively with the members of said switch, and a plug removably seated in said socket, and having contact-plates in electrical circuit with an alarm mechanism, substantially as specified.

5. In a milking apparatus, the combination with a receptacle, and means, including a conveyer, for exhausting the air from the interior of the receptacle, of a liquid-supply nozzle, a movable impact element arranged in the path of liquid entering the receptacle through said supply-nozzle, an electrically-actuated indicator, a switch controlling the indicator-circuit and having a movable member operatively connected with said impact element, an exhaust-controlling valve, and means, controlled by said movable switch member, for actuating said controlling-valve, substantially as specified.

6. In a milking apparatus, the combination with a receptacle, and means, including a conveyer, for exhausting the air from the interior of the receptacle, of a liquid-supply nozzle, a movable impact element arranged in the path of liquid entering the receptacle through said supply-nozzle, a switch having a movable member operatively connected with said impact element, and exhaust-controlling valve, and a valve-actuating magnet controlled by said switch, substantially as specified.

7. In a milking apparatus, the combination with a receptacle, of a lid or cover carrying supply and exhaust nozzles, exhausting means in communication with the exhaust-nozzle, an impact element arranged in the path of liquid entering the receptacle through the supply-nozzle, a movable supporting-arm for the impact element, a switch having fixed and movable members in electrical circuit with an indicating mechanism, the movable member of said switch being connected with said supporting-arm, an exhaust-controlling valve, and means, controlled by said movable member of the switch, for closing the exhaust-nozzle, substantially as specified.

8. In a milking apparatus, the combination with exhausting devices including a conveyer, of a receptacle, flexible means for supporting the receptacle, exhaust and supply nozzles in communication with the interior of the receptacle, the exhaust-nozzle being in communication with said exhaust-conveyer, an alarm mechanism removably connected to said receptacle, and liquid-actuated means carried by the receptacle for controlling the alarm mechanism and including as a part thereof a switch member coacting with said latter mechanism, substantially as specified.

9. In a milking apparatus, the combination with exhausting devices including a conveyer, of a receptacle, flexible means for supporting the receptacle, the same including suspending-cords adjustably mounted upon said conveyer, exhaust and supply nozzles in communication with the interior of the receptacle, the exhaust-nozzle being in communication with said exhaust-conveyer, an alarm mechanism removably connected to said receptacle, and liquid-actuated means carried by the receptacle for controlling the alarm mechanism and including as a part thereof a switch member coacting with the latter mechanism, substantially as specified.

10. In a milking apparatus, the combination with exhausting devices including a conveyer, of a receptacle, flexible means for supporting the receptacle, the same including suspending-cords and rings connected with said cords and mounted for axial adjustment upon said conveyer, exhaust and supply nozzles in communication with the interior of the receptacle, the exhaust-nozzle being in communication with said exhaust-conveyer, an alarm mechanism removably connected to the said receptacle, and liquid-actuated means carried by the receptacle for controlling the alarm mechanism and including as a part thereof a switch member coacting with said latter mechanism, substantially as specified.

In testimony that we claim the foregoing as our own we have hereto affixed our signatures in the presence of two witnesses.

DANIEL KLEIN.
WM. P. SWARTZ.

Witnesses:
D. COOK FOSTER,
J. E. SEELEY.